United States Patent [19]

O'Neal et al.

[11] 4,406,847
[45] Sep. 27, 1983

[54] METHOD FOR MAKING A LIP TYPE SHAFT SEAL HAVING A RESIN LINER

[75] Inventors: Robert D. O'Neal, Gastonia, N.C.; Dean R. Bainard, Clover, S.C.; Douglas A. Cather, Jr., Gastonia, N.C.

[73] Assignee: Garlock Inc., Longview, Tex.

[21] Appl. No.: 219,364

[22] Filed: Dec. 22, 1980

Related U.S. Application Data

[63] Continuation of Ser. No. 23,141, Mar. 23, 1979, abandoned.

[51] Int. Cl.³ .................... B29D 3/00; B29D 23/01
[52] U.S. Cl. .................... 264/138; 29/469.5; 264/163; 264/262; 264/266; 264/268; 425/DIG. 47
[58] Field of Search .............. 264/262, 266, 268, 127, 264/138, 163; 425/DIG. 47; 29/527.1, 469.5

[56] References Cited

U.S. PATENT DOCUMENTS

| | | |
|---|---|---|
| 3,462,333 | 8/1969 | McCormick et al. ....... 425/DIG. 47 |
| 3,536,806 | 10/1970 | Jackson ................. 264/268 |
| 3,733,155 | 5/1973 | Burke .................. 264/266 |
| 3,851,037 | 11/1974 | Day et al. .............. 264/268 |
| 4,006,210 | 2/1977 | Denton ................. 264/266 |
| 4,155,153 | 5/1979 | Bainard et al. ......... 425/DIG. 47 |
| 4,159,298 | 6/1979 | Bainard ................ 264/262 |
| 4,171,561 | 10/1979 | Bainard et al. ......... 29/527.1 |

FOREIGN PATENT DOCUMENTS 1508575 1/1968 France .
46-2381 7/1971 Japan .

OTHER PUBLICATIONS

"Rubber Seals & Packings for Fluids", Arai Catalogue Publication, Arai Seisakusho Co., Ltd., Tokyo, published 11/71 or earlier.

*Primary Examiner*—James B. Lowe
*Attorney, Agent, or Firm*—Richard W. Watson

[57] ABSTRACT

A method for molding an annular lip type shaft seal 10 of the type having an annular elastomeric shaft seal element 12 and a resin liner 14 (preferably polytetrafluoroethylene) integrally molded therewith and bonded thereto, including providing a step or shoulder 36 on the mold core 26 to prevent the resin liner 14 from flowing axially beyond a predetermined location during molding. The method includes providing a certain range of acute angles "α" between the shoulder surface 42 and the liner forming surface 38 of the mold core surface 34, and a certain range of shoulder heights "d" relative to the liner thickness "t", for various values of the initial viscosity of the elastomeric preform 18. The percentage of rejects due to undesired flow of the resin liner 14 during molding has been greatly reduced.

23 Claims, 5 Drawing Figures

METHOD FOR MAKING A LIP TYPE SHAFT SEAL HAVING A RESIN LINER

CROSS-REFERENCE TO RELATED APPLICATIONS

This application is a continuation of application Ser. No. 023,141, filed Mar. 23, 1979 now abandoned.

TECHNICAL FIELD

This invention relates to shaft seals and to a method for molding an annular lip type seal of the type having a resin liner (such as polytetrafluoroethylene) and in particular to controlling the resin liner flow during molding to reduce the number of rejects.

BACKGROUND OF THE PRIOR ART

Methods are known for molding an annular lip type shaft seal of the type having an elastomeric body or seal element with a resin liner (such as of polytetrafluoroethylene) integrally molded therewith and bonded thereto. Such known method includes placing a resin washer, an elastomeric preform and metal shell in a mold and closing the mold, see for example, Japanese patent publication Sho No. 46-2381, announced July 7, 1971 in the Japanese Patent Agency Patent Gazette. Such prior art has the problem of control over the degree or uniformity of axial length to which the resin liner is formed or extruded axially beyond the molded or trimmed lip of the seal, during the molding operation. If the liner flows too far it can thin out and split and can become trapped between elastomer and the metal shell causing bond problems in critical areas, or the liner can occupy part of the flex section of the seal affecting seal performance. This problem becomes more acute with increases in the viscosity or shearing force of the elastomer and with increasing lip diameters of the seal as well as with other factors involving the characteristics of the type and thickness of the resin being used.

It is an object of the present invention to provide an improved method for controlling the resin liner flow during molding and thereby to reduce the percentage of rejects occurring during molding shaft seals having resin liners due to undesired flow of the liner during molding It is another object of this invention to prevent liner material from entering the seal flex section.

It is another object of the present invention to provide a method for making an annular lip type shaft seal of the type having an annular elastomeric shaft seal element and a resin liner integrally molded therewith and bonded thereto, wherein the mold is provided with a step or shoulder and wherein the parameters of the angle the shoulder surface makes with the mold core, the shoulder height with respect to the liner thickness, and the initial viscosity of the elastomeric preform are maintained at certain relative values or ranges of values.

BRIEF SUMMARY OF THE INVENTION

A method for molding an annular lip type shaft seal of the type having an annular elastomeric shaft seal element and a resin liner integrally molded therewith and bonded thereto comprising placing a flat washer of resin liner material, an elastomeric preform and a metal shell in a cavity of an open mold and then closing the mold to form the seal. To prevent the liner from flowing axially beyond a predetermined location, the method includes providing the mold core with an annular lip forming surface facing radially outwardly and axially inwardly and providing on said lip forming surface an annular step or shoulder having an axially inwardly facing shoulder surface for contacting the edge of the resin liner and preventing the resin liner material from flowing axially outwardly beyond said shoulder. The shoulder is located axially between a recessed liner forming surface and an elastomeric seal element forming surface of said lip forming surface. Certain parameters that are involved are an angle "$\alpha$" between said shoulder surface and said liner forming surface, the thickness "$t$" of the liner, the perpendicular height "$d$" of the shoulder surface above the liner forming surface and the viscosity "$V$" of the elastomer. According to the present invention, the parameters $d$, $t$ and $\alpha$ preferably have the following values with respect to the initial viscosity of the elastomeric preform:

| Initial Viscosity "$v$" of Elastomer at 375° F. (Rheometer Units) | Polytetrafluoroethylene Flow-control step Dimensional Requirements |
|---|---|
| <10 | $d \geq t;\ \alpha \leq 85°$ |
| <15 | $d \geq 1.25t;\ \alpha \leq 80°$ |
| <20 | $d \geq 1.5t;\ \alpha \leq 75°$ |
| <25 | $d \geq 1.75t;\ \alpha \leq 70°$ |
| $\geq 25$ | $d \geq 2t;\ \alpha \leq 65°$ |

The method also includes closing the mold and applying heat and pressure thereto, forming the flat resin washer into a resin lip liner, flowing the elastomeric preform into a lip type shaft seal element substantially simultaneously with the liner forming step during the closing step, bonding the lip liner to the seal element and substantially simultaneously curing the elastomer while the mold is closed, opening the mold, and removing the formed, cured and bonded seal from the mold. In one embodiment, the resin lined seal lip is trimmed to form a finished trimmed lip shaft seal.

BRIEF DESCRIPTION OF THE DRAWINGS

The present invention will be more fully understood by reference to the following detailed description thereof, when read in conjunction with the attached drawings, wherein like reference numerals refer to like elements and wherein.

DETAILED DESCRIPTION OF THE INVENTION

Figure 5:
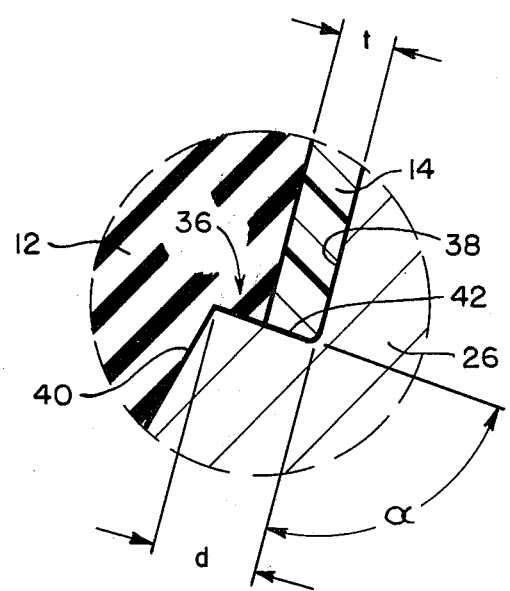
FIG. 5 is an enlarged, partial view of one portion of the seal and mold showing various of the parameters involved.

With reference now to the drawings, FIGS. 1–4 show the method of the present invention as applied to a trimmed lip seal and FIG. 5 is an enlarged partial cross-sectional view of the step or shoulder portion of the mold and molded seal showing various ones of the critical relationships that are involved.

FIGS. 1–4 show the method of the present invention for molding an annular, lip type shaft seal 10 (see FIG.

Figure 1:
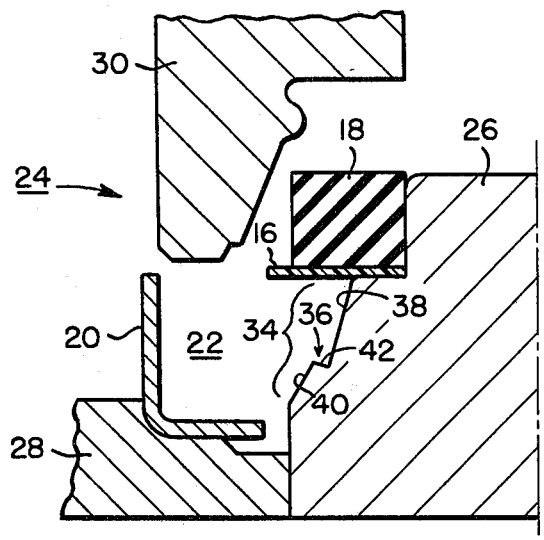
FIGS. 1–3 are partial cross-sectional views through a mold showing the molding method of the present invention, with FIG. 1 showning the mold open, FIG. 2 showing the mold partially closed and FIG. 3 showing the mold completely closed.

4) of the type having an annular molded elastomeric shaft seal element 12 and a resin liner 14. Referring to FIG. 1 the method comprises placing a flat washer 16 of resin liner material (preferably polytetrafluoroethylene), an elastomeric preform 18, and a metal shell 20 in a cavity 22 of an open compression mold 24. The mold 24 includes a mold core 26, a lower die member 28, and a moveable upper die member 30. The mold 24 is shown in its open position in FIG. 1 and in its closed position in FIG. 3.

Figure 2:
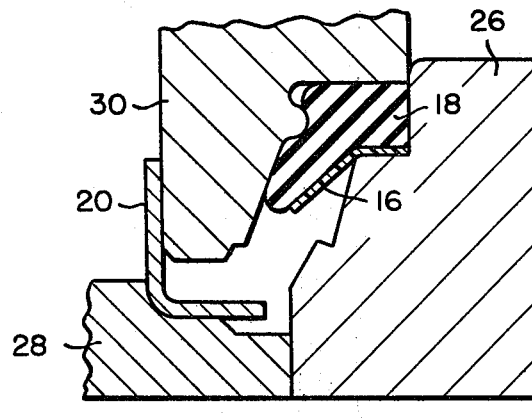
Figure 3:
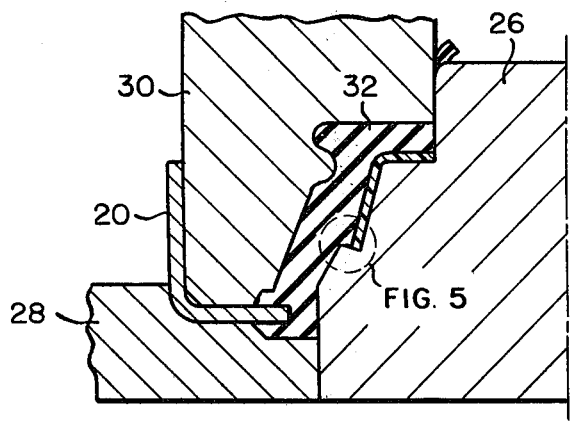
Figure 4:
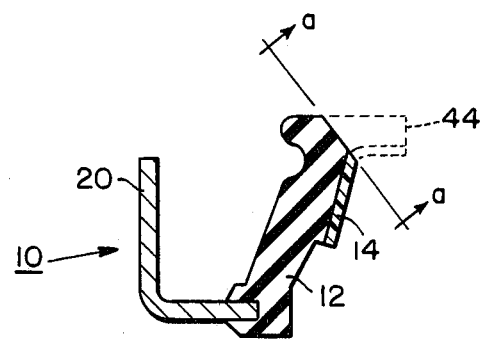
FIG. 4 is a partial cross-sectional view of a shaft seal made according to the method of the present invention.

The mold is then closed as shown in FIGS. 2 and 3 with heat and pressure being applied as is well-known to those skilled in the art. During this time, the flat resin washer 16 is formed into the resin lip liner 14, the elastomeric preform 18 is caused to flow into the shape of the elastomeric shaft seal element 12, the liner 14 is bonded to the seal element 12 in a manner well-known to those skilled in this art, and the elastomer of the seal element 12 is cured, all substantially simultaneously.

The mold 24 is then opened and a semi-finished seal assembly 32 (see FIG. 3) is removed. An excess portion 44 of the seal assembly 32 (shown in dotted lines in FIG. 4) is then trimmed off along the line "a-a" to produce the finished shaft seal 10.

The mold core 26 includes (see FIGS. 1 and 5) an annular lip forming surface 34 facing radially outwardly and axially inwardly. The direction "radially outwardly" is of course to the left in FIG. 1 and the direction "axially inwardly" is vertically up in FIG. 1 (this later term is with reference to the volume to be sealed by the seal 10, which is vertically up in FIGS. 1 to 4).

The lip forming surface 34 includes an annular step or shoulder 36 separating the surface 34 into a recessed liner forming surface 38 and an elastomeric element forming surface 40. The shoulder 36 includes an axially inwardly facing shoulder surface 42.

Referring further to FIG. 5, various parameters concerning the shoulder 36 are shown as follows: "$\alpha$" is the acute angle between the shoulder surface 42 and the liner forming surface 38; "d" is the perpendicular height the shoulder 36 extends above (radially outwardly of) the liner forming surface 38, and "t" is the thickness of the liner 14.

According to the present invention, an important and critical relationship exists between these parameters and the initial viscosity of the elastomeric preform 18. That is, in order to properly and positively control the flow of the liner 14 by having the shoulder 36 contact the outer edge of the liner 14 and prevent the liner from flowing past the shoulder (which control significantly reduces the percentage of rejects due to improper liner flow), the preferred relationships between these parameters, according to the present invention, is as set forth below:

| Initial Viscosity of the Elastomeric Preform 18 at 375° F. (in Rheometer units) | Preferred values of Parameters $\alpha$, d, and t |
| --- | --- |
| <10 | $d \geq t$; $\alpha \leq 85°$ |
| <15 | $d \geq 1.25t$; $\alpha \leq 80°$ |
| <20 | $d \geq 1.5t$; $\alpha \leq 75°$ |
| <25 | $d \geq 1.75t$; $\alpha \leq 70°$ |
| $\geq 25$ | $d \geq 2t$; $\alpha \leq 65°$ |

Thus, where space permits, molds will be useful with a wider range of elastomers if d is maximized and $\alpha$ is minimized.

Thus, as the viscosity increases, the height d should be increased relative to t and the angle $\alpha$ should be decreased, all as shown above.

While the above description relates to a trimmed lip seal, the present invention is also applicable to molded lip seals. The resin washer 16 can be treated prior to molding as is known by those skilled in the art, to allow the elastomer to bond to the adjacent resin liner surface. The resin liner 14 can be, for example, a fluorocarbon resin (and as stated above is preferably polytetrafluoroethylene). The present invention provides a significant reduction in the reject rate due to improper liner flow from about 15% or more when using an obtuse shoulder angle $\alpha$ to less than about 1%. In the preferred embodiment, the liner 14 has a thickness t of about 0.015 inch. Further, in the preferred embodiment the seal 10 is made with a molded approach angle of from about 10° to 15°. The molded approach angle is the angle between the axis of the mold and the surface 38 in FIG. 1, for example. The method of the present invention can also be used in combination with a mold having means for forming hydrodynamic pumping elements on the resin liner. While compression molding has been described above, the present invention can also be used with other molding methods such as transfer and injection molding, for example.

The invention has been described in detail with particular reference to the preferred embodiments thereof, but it will be understood that variations and modifications can be affected within the spirit and scope of the invention as described hereinafter and as defined in the appended claims.

We claim:

1. A method for molding an annular lip type shaft seal of the type having an annular elastomeric shaft seal element and a resin liner integrally molded therewith and bonded thereto, said method comprising the steps of:

(a) placing a resin liner element having a thickness t, an elastomeric preform and a seal shell in a mold having an annular lip forming surface;

(b) providing, on said lip forming surface, an annular shoulder having a shoulder surface facing said liner element and adapted to contact an outer edge of said liner element during molding for preventing said resin liner element from flowing axially past said shoulder, said shoulder being located axially between a liner forming surface and an elastomeric seal element forming surface, said shoulder making an angle $\alpha$ with said liner forming surface and having a perpendicular height d above said liner forming surface;

(c) providing $\alpha$ and d with the values $\alpha \leq 85°$ and $d \geq t$; and (d) operating said mold for forming said liner element into said liner and causing said elastomer to flow to form said shaft seal element and applying heat and pressure thereto for forming said seal.

2. The method according to claim 1 wherein said placing step comprises placing in said mold an elastomeric preform having an initial viscosity "V" in rheometer units at about 375° of V<10.

3. The method according to claim 1 wherein said placing step comprises placing in said mold an elastomeric preform having an initial viscosity "V" in rheometer units at 375° F. of V<15, and wherein said providing step includes providing $\alpha \leq 80°$ and providing $d \geq 1.25t$.

4. The method according to claim 1 wherein said placing step comprises placing in said mold an elastomeric preform having an initial viscosity "V" in rheometer units at 375° F. of V<20, and wherein said providing step includes providing $\alpha \leq 75°$ and providing $d \geq 1.5t$.

5. The method according to claim 1 wherein said placing step comprises placing an elastomeric preform having an initial viscosity "V" in rheometer units at 375° F. of V<25, and wherein said providing step includes providing $\alpha \leq 70°$ and providing $d \geq 1.75t$.

6. The method according to claim 1 wherein said placing step comprises placing an elastomeric preform having an initial viscosity "V" in rheometer units at 375° F. of V≥25, and wherein said providing step includes providing $\alpha \leq 65°$ and providing $d \geq 2t$.

7. The method according to claim 1 wherein said resin liner element is a fluorocarbon resin.

8. The method according to claim 1 wherein said resin liner element is polytetrafluoroethylene.

9. The method according to claim 1 further including forming hydrodynamic pumping elements on said resin liner substantially simultaneously with said forming step.

10. The method according to claim 1 wherein said providing step comprises providing $\alpha$ in the range of from about 85° to 65° and providing d in the range of from about 1t to 2t.

11. The method according to claim 1 including placing said resin liner element in said mold as a flat washer and including forming said flat resin washer into a resin lip liner; flowing said elastomeric preform into a lip type shaft seal element substantially simultaneously with said forming step during said closing step; bonding said lip liner to said seal element and substantially simultaneously curing said elastomer while said mold is closed; opening said mold; and removing the formed, cured and bonded seal from the mold.

12. A method for molding an annular lip type shaft seal of the type having an annular elastomeric shaft seal element and a resin liner integrally molded therewith and bonded thereto, comprising:
(a) placing a resin liner having a thickness t and an elastomeric preform in a mold having a mold core with a radially outwardly facing lip forming surface,
(b) forcing the elastomeric preform to flow in said mold and form said liner against said lip forming surface,
(c) providing on said lip forming surface an annular shoulder located axially between a liner forming surface and an elastomeric seal element forming surface, said shoulder having a shoulder surface facing said liner and adapted to contact an outer edge of said liner during molding and to prevent said liner from flowing past said shoulder, said shoulder surface making an acute angle $\alpha$ with said liner forming surface and having a perpendicular height d above said liner forming surface, and
(d) providing $\alpha$ and d with the values: $\alpha \leq 85°$ and $d \geq t$.

13. The method according to claim 12 wherein said placing step comprises placing in said mold an elastomeric preform having an initial viscosity "V" in rheometer units at about 375° F. of V<10.

14. The method according to claim 12 wherein said placing step comprises placing in said mold an elastomeric preform having an initial viscosity "V" in rheometer units at about 375° F. of V<15, and including providing $d \geq 1.25t$ and providing $\alpha \leq 80°$.

15. The method according to claim 12 wherein said placing step comprises placing in said mold an elastomeric preform having an initial viscosity "V" in rheometer units at about 375° of V<20 and including providing $d \geq 1.5t$ and providing $\alpha \leq 75°$.

16. The method according to claim 12 wherein said placing step comprises placing in said mold an elastomeric preform having an initial viscosity "V" in rheometer units at about 375° of V<25 and including providing $d \geq 1.75t$ and providing $\alpha \leq 70°$.

17. The method according to claim 12 wherein said placing step comprises placing in said mold an elastomeric preform having an initial viscosity "V" in rheometer units at about 375° of V≥25 and including providing $d \geq 2t$ and providing $\alpha \leq 65°$.

18. A method for molding an annular lip type shaft seal of the type having an annular elastomeric shaft seal element and a resin liner integrally molded therewith and bonded thereto, said method comprising the steps of:
(a) placing a flat washer of resin liner material having a thickness t, an elastomeric preform and a seal shell in an open mold having an annular lip forming surface facing radially outwardly and axially inwardly;
(b) providing on said lip forming surface an annular shoulder having an axially inwardly facing shoulder surface for preventing said resin liner material from flowing axially outwardly beyond said shoulder, said shoulder being located axially between a liner forming surface and an elastomeric seal element forming surface of said lip forming surface, said liner forming surface being recessed radially inwardly relative to said seal element forming surface, said providing step including providing an angle $\alpha$ between said shoulder surface and said liner forming surface, and providing a height d for the perpendicular height said shoulder surface extends above said liner forming surface;
(c) providing $\alpha \leq 85°$ and providing $d \geq t$;
(d) closing said open mold and applying heat and pressure thereto;
(e) forming said flat resin washer into a resin lip liner;
(f) flowing said elastomeric preform into a lip type shaft seal element substantially simultaneously with said forming step during said closing step;
(g) bonding said lip liner to said seal element and substantially simultaneously curing said elastomer while said mold is closed;
(h) opening said mold;
(i) removing the formed, cured and bonded semifinished seal assembly from the mold; and
(j) trimming an excess portion of the resin lined seal lip off of said assembly to form a finished shaft seal.

19. The method according to claim 18 wherein said placing step comprises placing an elastomeric preform having an initial viscosity "V" in rheometer units at about 375° F. of $V \leq 10$.

20. The method according to claim 18 wherein said placing step comprises placing an elastomeric preform having an initial viscosity "V" in rheometer units at 375° F. of V<15, and wherein said providing step includes providing $\alpha \leq 80°$ and providing $d \geq 1.25t$.

21. The method according to claim 18 wherein said placing step comprises placing an elastomeric preform having an initial viscosity "V" in rheometer units at 375° F. of V<20, and wherein said providing step includes providing $\alpha \leq 75°$ and providing $d \geq 1.5t$.

22. The method according to claim 18 wherein said placing step comprises placing an elastomeric preform having an initial viscosity "V" in rheometer units at 375° F. of V<25, and wherein said providing step includes providing $\alpha \leq 70°$ and providing $d \geq 1.75t$.

23. The method according to claim 18 wherein said placing step comprises placing an elastomeric preform having an initial viscosity "V" in rheometer units at 375° of V≥25, and wherein said providing step includes providing $\alpha \leq 65°$ and providing $d \geq 2t$.

* * * * *